Patented Dec. 7, 1926.

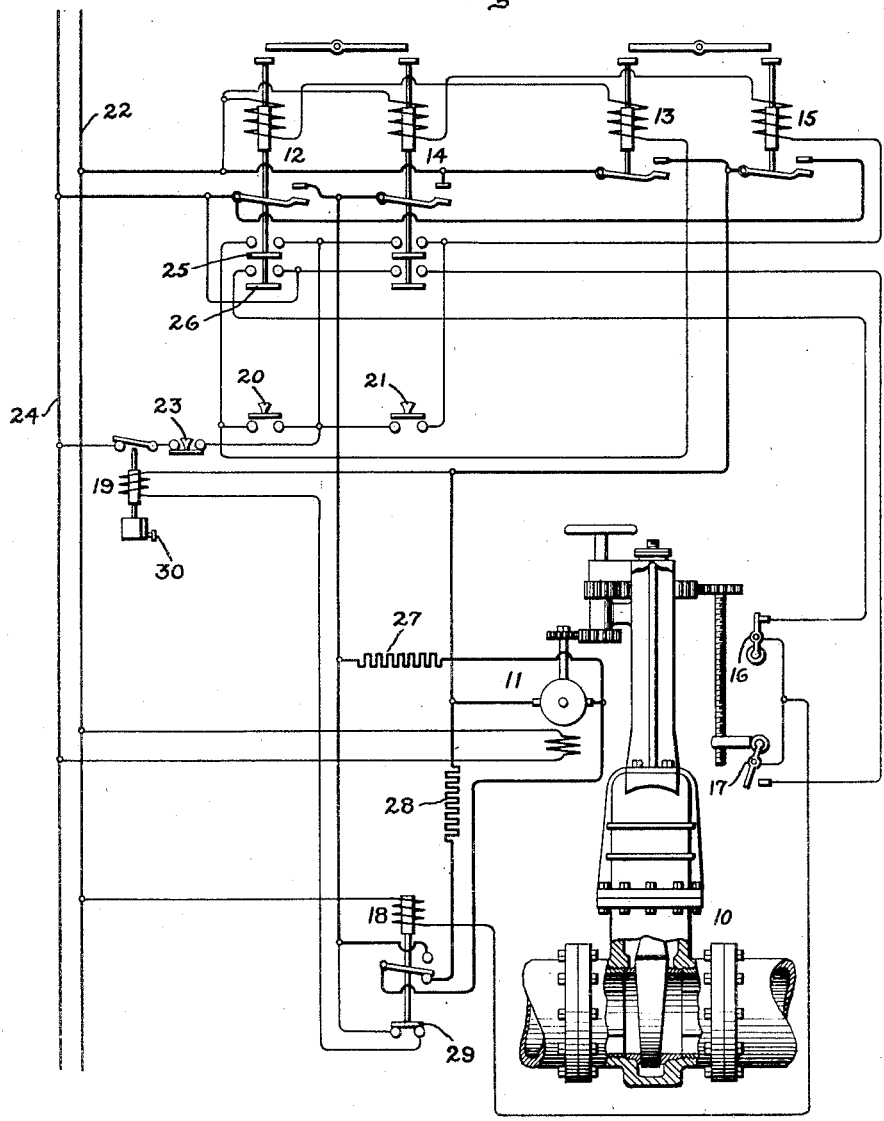

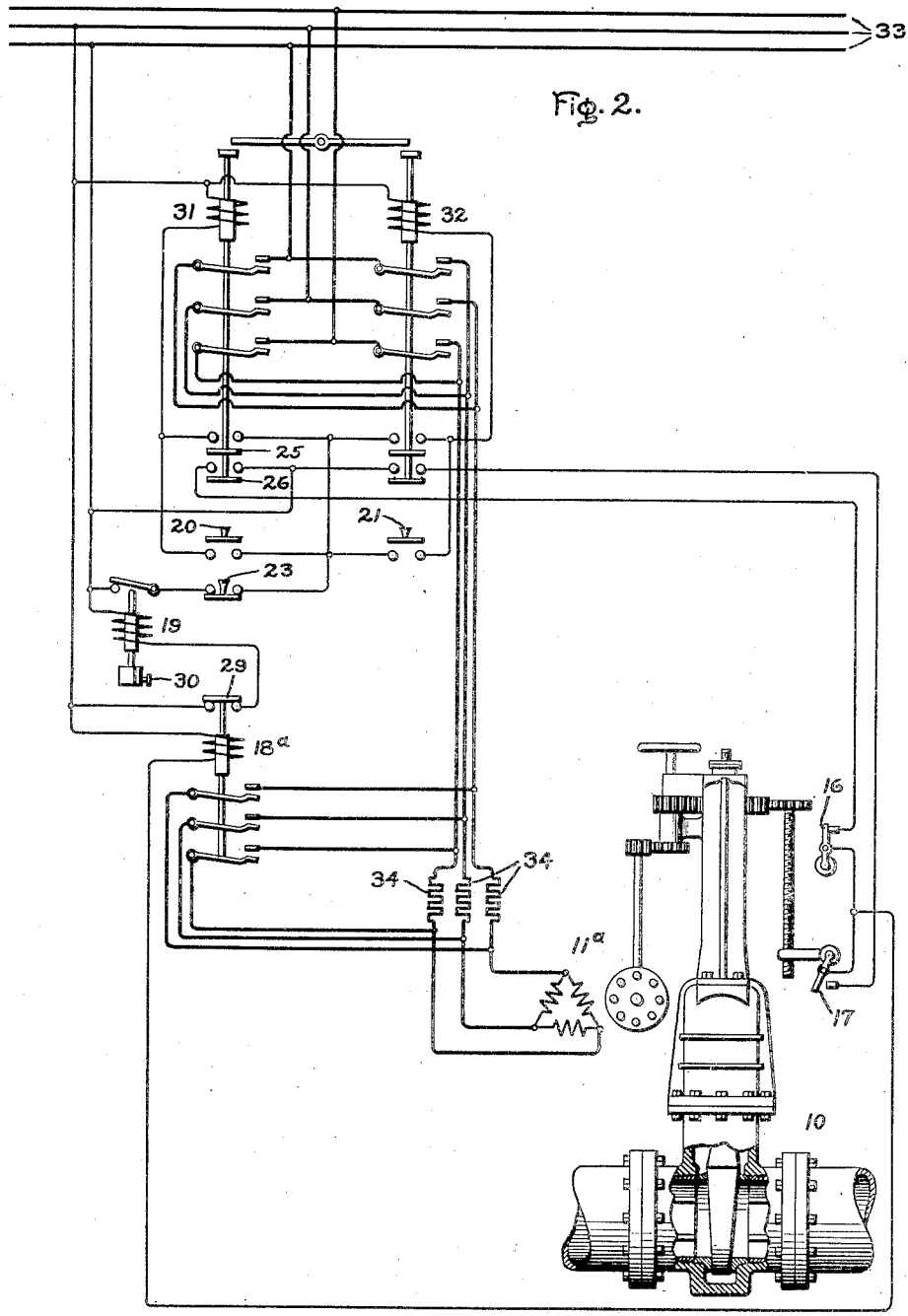

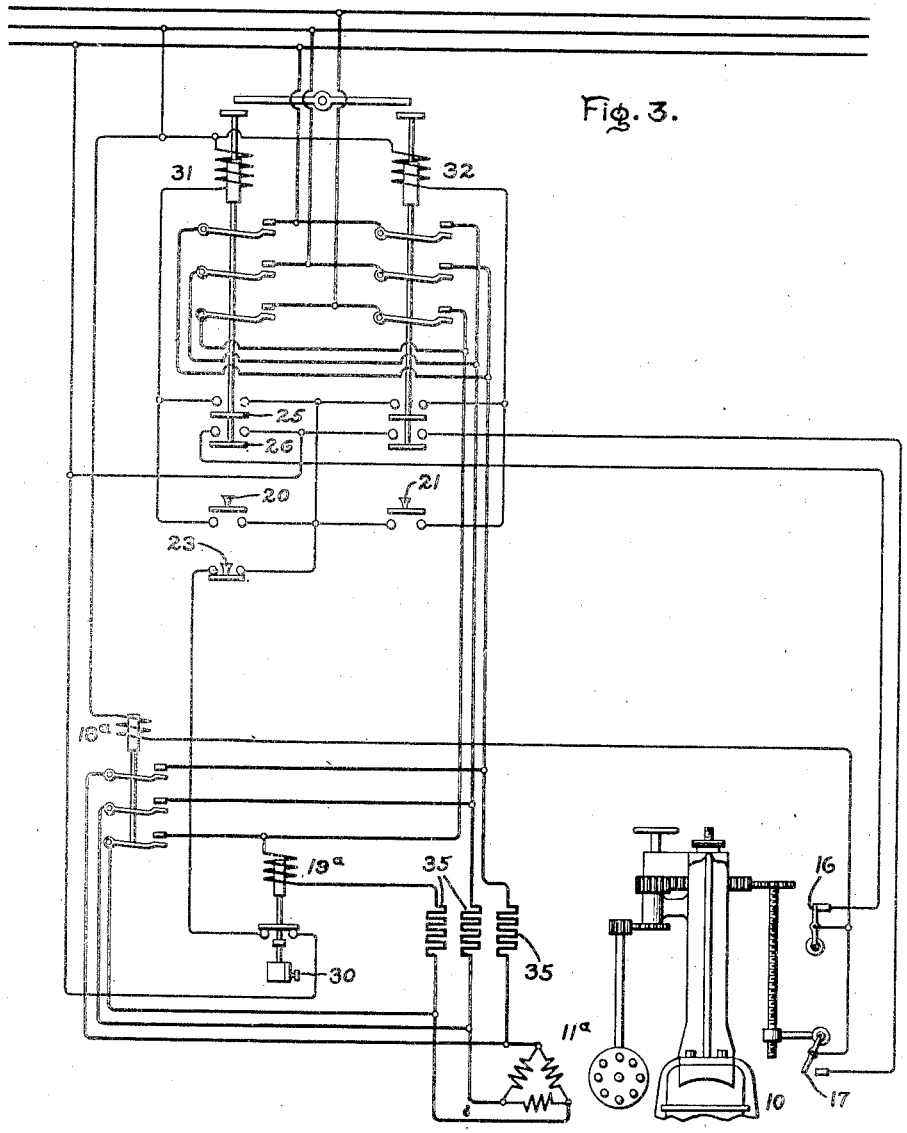

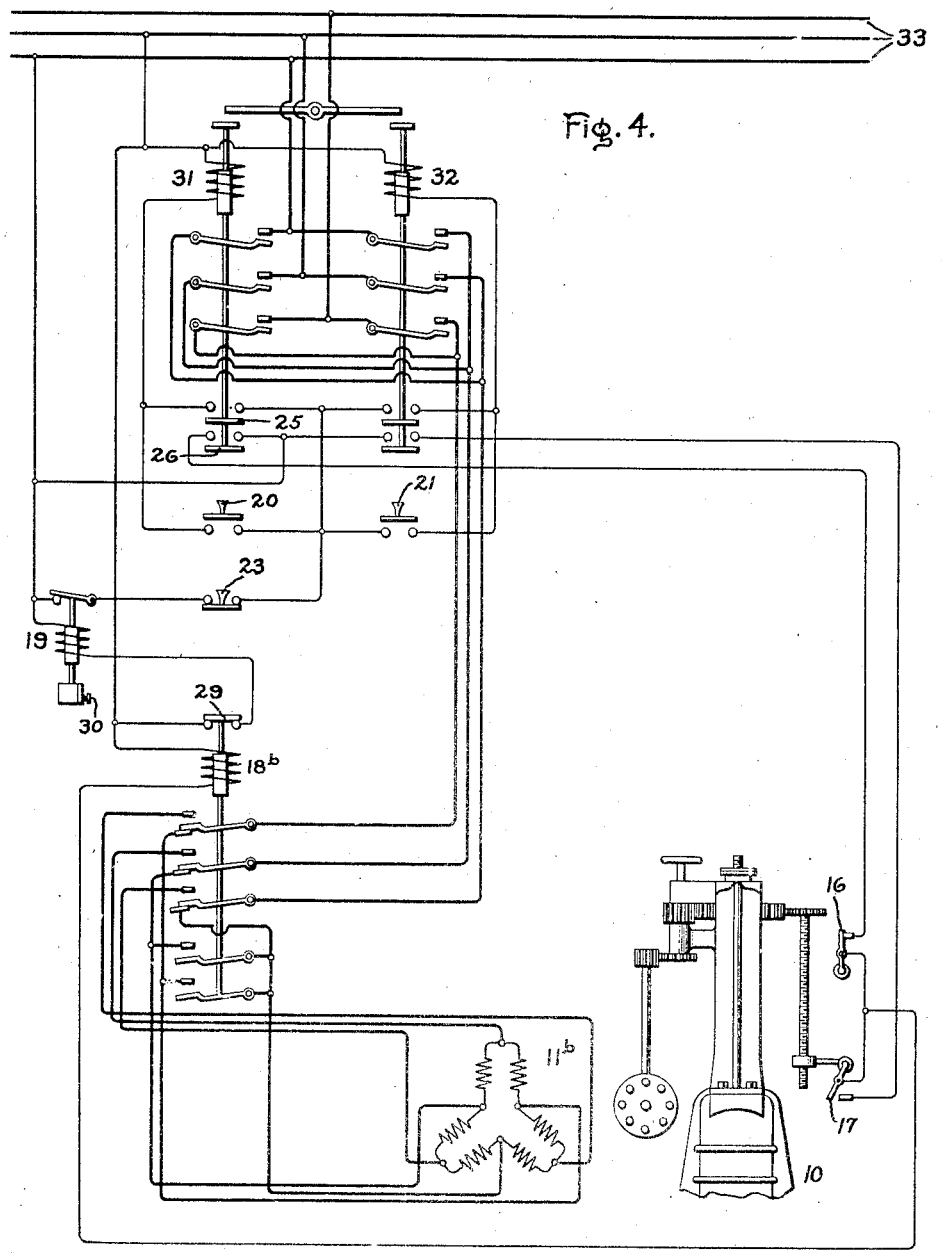

1,610,080

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

MOTOR CONTROL.

Application filed November 20, 1922. Serial No. 601,959.

My invention relates to systems of motor control and in particular to systems wherein a device is operated by a motor to a limit of operation.

Although the invention is not necessarily limited thereto, it has a particular application in the control of an electric motor for operating a valve.

Systems of control for valves have heretofore been arranged in such a manner that the motor which operates the valve is deenergized before the valve is closed or opened, and the valve is permitted to drift to the closed or open position due to the inertia of the parts. It has also been proposed to operate the valve to the closed or open position and then disconnect the motor from the valve, the disconnection being governed by a limit switch. Difficulties have been encountered particularly in the closing of large valves due to the fact that variations in temperature, wear of the parts, pressure of the fluid controlled by the valves, etc., have introduced variables in the closing of the valves so that it is quite uncertain as to whether or not the valves will seat properly.

One of the objects of the invention is to provide a system whereby a device operated by a motor is caused to be operated exactly to the limit of operation regardless of the variables which tend to render the operation uncertain.

As applied to a system of control for a valve, the object of the invention is to provide an arrangement whereby the valve is operated exactly to the closed or open position regardless of variations in temperature, pressure, wear, etc.

In carrying the invention into effect in one form, the control is such that before the limit of operation of the device is reached, the effort of the operating motor is reduced, by reducing either the speed of the motor or the torque of the motor, or by reducing both the speed and the torque of the operating motor, so that the device is operated to the full limit of operation with power applied to the motor, but the motor is under such control that no damage is done at the limit of operation. When the motor stalls at the limit of operation, the motor may be automatically deenergized. The arrangement is also such that full power is applied to the motor for returning the device from the limit of operation.

These and other objects of the invention as will be either apparent to those skilled in the art or as will be pointed out fully hereinafter are attained in the systems of motor control illustrated in very simplified diagrams in the accompanying drawings.

Referring to the drawing, Fig. 1 shows a simplified diagram of a system of motor control of a direct current motor for opening and closing a valve; Fig. 2 is a similar system for an alternating current motor in which the effort of the valve motor is reduced by inserting resistance in the motor primary circuit before the limit of operation of the valve is reached and then automatically deenergizing the motor an interval of time after the valve has either closed or opened; Fig. 3 is a system similar to Fig. 2, except that the automatic deenergization of the automatic current motor is effected by means of a current limit—time limit relay which is under the control of the effort reducing switch mechanism; Fig. 4 is a system similar to Fig. 2, with the exception that the operating motor is of the variable pole type and the reduction of the effort of the motor before the valve is closed is accomplished by automatically switching from a high speed to a low speed winding of the motor.

Referring to Fig. 1, the device to be operated to and from a limit or limits of operation is indicated as the valve 10 which is operated by means of the electric motor 11 which is shown as of the direct current type. The motor 11 is operated in the forward or the reverse direction so as to either open or close the valve by controlling the operation of the electromagnetic reversing switch mechanism comprising the electromagnetic switches 12 and 13 for the opening of the valve and the electromagnetic switches 14 and 15 for the closing of the valve. These reversing switches are suitably interlocked as indicated so as to prevent one set of switches from closing while the other set is closed. The limit switches 16 and 17 are provided for controlling the electromagnetic effort reducing switch mechanism 18 so as to reduce the effort of the motor before a limit of operation of the valve is reached, and the relay 19 which is under the control of the limit switch mechanism and the electromagnetic switch 18 is provided for automatically deenergizing the reversing or line switch mechanism after the valve has either been opened or closed and the motor has stalled. The push button 20 is provided for energizing the electromagnetic line switches 12 and 13 so as to open the valve and the push button 21 is provided for controlling the electromagnetic line switches 14 and 15 for closing the valve.

As thus constructed and arranged and with the parts in their respective positions shown in the drawing, the operation of my invention is as follows:—The valve 10 is shown in the closed position and it will be assumed that it is desired to open the same. The push buton 20 will first be closed, thereby energizing the operating electromagnets of the switches 12 and 13 from the supply conductor 22, through the windings of the said switches, the push button 20, the stop push button 23, switch member of the time limit relay 19, to the other supply conductor 24. When the switch closes, a maintaining circuit for the windings of the switches 12 and 13 is established through the auxiliary switch 25 so that the push button 20 may be released. The closing of the auxiliary switch 26 associated with a line switch 12 energizes the effort controlling electromagnetic switch 18 through a circuit from the supply conductor 22, winding of switch 18, limit switch 16, auxiliary switch 26, to supply conductor 24. The electromagnetic switch 18 will operate and thereby connect the motor armature directly to the supply circuit 22—24. Full power is thus applied to the motor to cause the same to operate the valve from the closed position to the open position. After the opening of the valve has proceeded a short distance, the limit switch 17 will close, but this will have no effect upon the operation of the motor at this time. When the valve has been operated by the motor to nearly the full open position, the limit switch 16 is automatically opened, thereby deenergizing the effort reducing electromagnetic switch 18 so that this switch will open the circuit through its upper main contact and close the circuit through the lower main contact. The motor armature is now connected in series relation with the resistor 27 and the resistor 28 is connected in shunt to the motor armature, so that the speed and torque of the motor are thereby automatically reduced before the limit of operation of the valve is reached. It will be noticed that the continuation of the movement of the valve proceeds with power being delivered by the motor to continue the operation to the full open position but that the effort of the motor is reduced because the speed and torque of the motor have been reduced. The electromagnetic time limit relay 19 is energized through the auxiliary switch 29 associated with the electromagnetic switch 18, so that after an interval of time which will be sufficient for the motor to operate the valve to the full open position and the valve motor to be stalled because of the fact that further movement of the valve in this direction is mechanically arrested, the switch member of the time limit relay 19 will be operated to the open position, thereby deenergizing the line switches 12 and 13 and automatically disconnecting the motor from the source of supply. The time limit relay 19 may be adjusted to operate in any given time interval by means of the adjusting screw 30, as will be understood by those skilled in the art. Assume that the valve is in the open position, and that it is desired that the valve shall close. The push button 21 will first be closed, thereby energizing the electromagnetic line switches 14 and 15, establishing a maintaining circuit about the push button 21 and energizing the effort controlling electromagnetic switches 18 in a manner similar to that previously described for the opening of the switch, as will be understood by those skilled in the art. When the valve has been operated to nearly the closed position, the limit switch 17 will be opened, thereby deenergizing the electromagnetic switch 18 and reducing the effort of the motor in the same manner as above described in connection with the opening of the valve. An interval after the valve is fully closed and the motor has stalled due to the fact that further movement of the valve in this direction is mechanically arrested, the time limit relay 19 will operate to open the line switches 14 and 15 and thus deenergize the motor. It will be observed that full power is supplied by the motor to the opening and the closing of the valve, and that before the valve has reached a limit of operation, either the closed or open position, the effort of the motor is reduced so that the continuation of the movement of the valve to the final limit of operation proceeds with power being delivered by the motor so that the valve is positively closed or opened, and that after the motor has stalled at the limit of operation, the motor is automatically deenergized. The operation of the valve is thus certain and positive, and variations such as caused by variations in temperature, wear of parts, pressure of the fluid controlled by the valve, will have no effect in rendering the operation of the valve uncertain. It will also be observed that there is a positive driving connection between the valve, the valve stem and the electric motor, and that no changes in the positive connection between the valve stem and the valve of the customary valve of commerce are necessary in order to employ the invention.

Referring to Fig. 2, it will be seen that I have embodied my invention in the control of a valve which is operated by means of an alternating current motor, thereby illustrating the adaptability of my invention to various types of electric motors. In this drawing, the parts which are similar to those shown in Fig. 1 are indicated by the same reference numerals. It is believed that from the description of the invention which has been given in connection with Fig. 1, those skilled in the art will readily understand the embodiment of the invention shown in Fig. 2 from a brief explanation of the operation of the arrangement. The valve is shown as in the closed position, so that the next operation of the valve will be the opening movement. In order to cause the valve to open, the push button 20 will be closed, thereby energizing the line contactor 31 to close and connect the alternating current electric motor 11ª to the supply circuit 33. A maintaining circuit for the winding of the line contactor 31 will be established through the auxiliary switch 25 associated with the line contactor so that the push button 20 may be released, and a circuit for the winding of the effort reducing contactor 18ª is established through the auxiliary switch 26 and the limit switch 16. The contactor 18ª is thereby energized to close and short circuit the resistors 34 in the primary circuit of the motor, so that the full supply circuit potential is applied to the motor and the valve will be operated from the closed position with substantially full power being delivered from the motor. When the limit switch mechanism is operated shortly before the valve is open, the effort reducing contactor 18ª will be deenergized by the opening of the limit switch 16. This will cause the resistors 34 to be inserted in the primary circuit of the electric motor 11ª, thereby reducing the torque of this motor. The winding of the relay 19 will be energized through the auxiliary switch 29 by the opening of the contactor 18ª, and after an interval of time determined by the setting of the dash pot adjusting device 30, the line contactor 31 will be deenergized at the contacts of the time limit relay 19. In order to operate the valve to the closed position, the push button 21 will be closed, thereby energizing the line contactor 32 to close and establish a maintaining circuit for its winding independently of the push button 21 so that this push button may be released. The winding of the contactor 18ª will be energized through the lower auxiliary switch associated with the line contactor 32 and the limit switch 17 so that the resistors 34 will be short circuited and full potential will be applied to the motor for operating the valve to the closed position. The limit switch 17 will be opened a short distance before the valve is closed, thereby deenergizing the contactor 18ª, inserting the resistors 34 in the motor circuit so as to reduce the torque of the motor, and when the valve is completely closed and the motor has stalled, the time limit relay 19 will operate to deenergize the line contactor 32 and thus disconnect the motor from the source of supply.

In the arrangement as shown in Fig. 3, the operation is essentially the same as that described in connection with the arrangement of Fig. 2, with the exception that in this arrangement the relay 19ª is energized responsively to the current taken by the motor when the effort reducing contactor 18ª has been opened so as to insert the resistors 35 in the primary circuit of the alternating current type electric motor 11ª before the valve is either fully closed or opened. This relay 19ª is adjusted so that when the current taken by the motor increases, due to the fact that the valve is either closed or opened and the motor has stalled, the relay will operate so as to deenergize the line contactor 31 or 32 which had been closed to effect the particular operation of the valve desired. It will be observed that in this embodiment of my invention the deenergization of the electric motor is in accordance with the current taken by the motor rather than in accordance with a time function. Thus, in the arrangement of Figs. 1 and 2, the deenergization of the electric motor will always be a definite time interval after the opening of the particular limit switch, and this time interval will be adjusted so that the motor will have time to operate the valve to the full open or closed position. In the arrangement of Fig. 3, when the valve has been operated to the full open or closed position, the current taken by the motor will increase considerably because of the fact that the motor is stalled, and this feature is made use of in the control of the deenergization of the motor. In the arrangement of Fig. 4, the valve is operated to the open and closed positions by means of an alternating current type electric motor 11ᵇ, which is indicated as of the multipole-two-speed type of motor. The effort reducing contactor 18ᵇ is biased by gravity to a position in which the high pole number, low speed winding of the motor is connected to the supply circuit 33. When the contactor 18ᵇ is energized, the low pole number, high speed winding of the motor is connected to the supply circuit. In general, the operation of this arrangement is the same as the arrangement of Fig. 2, with the exception that the contactor 18$^b$ controls the two-speed windings of a motor instead of controlling resistors in the primary circuit of the motor. The valve will be operated through the major portion of its travel by the motor 11$^b$ with the high speed winding of the motor connected in circuit. When the limit switch mechanism operates before the valve has operated to its limit of operation, the contactor 18$^b$ will be deenergized and the low speed winding of the motor will be connected to the supply circuit, so that the final movement of the valve will proceed with the speed of the motor very materially reduced. When the valve has either closed or opened and the motor has stalled, the time limit relay 19 will be energized to disconnect the motor from the supply circuit.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is,—

1. The combination with a device movable to a limit of operation at which further operation of the device is mechanically arrested, of a motor connected in positive driving relation with the device for operating the device to the said limit of operation, a control for the motor arranged to maintain the energization of the motor until the device is operated by the motor to the said limit of operation and the motor stalls due to further operation of the device in the same direction being mechanically arrested, and means for automatically reducing the effort of the motor before the said limit of operation is reached.

2. The combination with a device movable to a limit of operation at which further operation of the device is mechanically arrested, of a motor connected in positive driving relation with the device for operating the device to the said limit of operation, means for automatically reducing the effort of the motor before the said limit of operation is reached, means for automatically deenergizing the motor after the motor stalls at the limit of operation of the device due to further operation of the device in the same direction being mechanically arrested, and connections through which the motor is energized for full initial torque for the return of the device from said limit.

3. The combination with a device movable to a limit of operation at which further operation of the device is mechanically arrested, of a motor connected in positive driving relation with the device for operating the device to said limit, means for automatically reducing the effort of the motor before the said limit of operation is reached, time element means set in operation upon the reduction in the motor effort for automatically deenergizing the motor after the motor stalls at the said limit of operation due to further operation of the device in the same direction being mechanically arrested, and connections through which the motor is energized for full initial torque for the return of said device from said limit.

4. The combination with a valve and an electric motor for operating the same between limits at which further operation of the valve is arrested to open and close the valve, of means comprising limit switch mechanism for automatically reducing the effort of the motor before a limit of operation of the valve is reached, and switch mechanism under the control of said limit switch mechanism for automatically deenergizing the motor after the valve is operated to a limit and the motor stalls.

5. The combination with a valve and an electric motor for closing the same, of line switch mechanism for connecting the motor to a source of supply, means comprising limit switch mechanism for automatically reducing the effort of the motor before the valve is closed, and a relay under the control of the said limit switch mechanism for automatically opening the said line switch mechanism after the valve is closed and the motor stalls.

6. The combination with a valve and an electric motor for opening and closing the same, of line switch mechanism for connecting the motor to a source of supply, switch mechanism for controlling the effort of the motor, limit switch mechanism for controlling the said switch mechanism to reduce the effort of the motor before the valve is opened or closed, and a relay under the control of the said effort controlling switch mechanism for opening the said line switch mechanism after the valve is opened or closed and the motor stalls.

7. The combination with a valve and an electric motor for opening and closing the same, of means comprising limit switch mechanism for automatically reducing the effort of the motor when the valve is nearly closed, and a time limit switch set in operation by said means for automatically deenergizing the motor after the valve is closed and the motor is stalled.

8. The combination with a valve and an electric motor for operating the same, of reversing switch mechanism for controlling the opening and closing of the valve, resistance for controlling the motor, electromagnetic switch mechanism for controlling the said resistance, limit switch mechanism for automatically controlling the said electromagnetic switch mechanism to include the said resistance in circuit with the motor to reduce the effort of the motor before the valve is closed or opened, and a relay energized responsively to the operation of the said electromagnetic switch mechanism for automatically opening the said reversing switch mechanism to deenergize the motor after the valve is closed or opened and the motor stalls.

In witness whereof, I have hereunto set my hand this 17th day of November, 1922.

JOHN EATON.